United States Patent [19]

Kawaguchi

[11] Patent Number: 4,779,482
[45] Date of Patent: Oct. 25, 1988

[54] ADJUSTABLE MANIPULATING LEVER FOR MOTORCYCLE

[75] Inventor: Takeshi Kawaguchi, Saitama, Japan

[73] Assignee: Honda Giken Kogyo Kabushiki Kaisha, Tokyo, Japan

[21] Appl. No.: 937,958

[22] Filed: Dec. 4, 1986

[30] Foreign Application Priority Data

Dec. 6, 1985 [JP] Japan .................. 61-275711

[51] Int. Cl.⁴ .............................................. G05G 1/04
[52] U.S. Cl. .................................. 74/523; 188/196 BA;
188/265; 74/489
[58] Field of Search .............. 74/501 R, 523, 489,
74/488, 522, 502.2; 192/111 A, 85 R, 99 S, 110
R; 188/196 BA, 265

[56] References Cited

U.S. PATENT DOCUMENTS

| | | | |
|---|---|---|---|
| 2,785,586 | 3/1957 | Schwerdhofer | 74/489 |
| 3,845,847 | 11/1974 | Camp | 188/265 |
| 3,948,361 | 4/1976 | Carlson | 188/265 |
| 4,066,154 | 1/1978 | Ross | 188/196 BA |
| 4,084,449 | 4/1978 | Kine | 74/522 |
| 4,318,307 | 3/1982 | Kine | 74/522 |
| 4,348,916 | 9/1982 | Shimano | 74/522 |
| 4,364,283 | 12/1982 | Ricardo | 74/489 |
| 4,391,160 | 7/1983 | Myers | 74/551.8 |
| 4,560,049 | 12/1985 | Uchibaba et al. | 192/85 R |
| 4,611,500 | 9/1986 | Nagano | 74/522 |
| 4,658,667 | 4/1987 | Schuller | 74/501 R |
| 4,679,460 | 7/1987 | Yoshigai | 74/522 |

FOREIGN PATENT DOCUMENTS

| | | | |
|---|---|---|---|
| 173513 | 3/1986 | European Pat. Off. | 74/523 |
| 1014731 | 8/1952 | France | 74/551.8 |
| 0066516 | 6/1981 | Japan | 74/501.5 R |
| 635426 | 4/1950 | United Kingdom | 74/523 |

*Primary Examiner*—Richard E. Moore
*Assistant Examiner*—Vinh Luong
*Attorney, Agent, or Firm*—Lyon & Lyon

[57] ABSTRACT

A hand-operated lever for operating a control member, such as the master cylinder of the braking system for a motorcycle, is mounted on the handle grip thereof in a manner to permit adjustment of the lever with respect to the handle grip. The lever is resiliently biased with respect to the control member in order to eliminate "dead travel" from lever operation and to prevent dislodgement of the lever from its adjusted position due to vibration or jarring of the motorcycle.

16 Claims, 4 Drawing Sheets

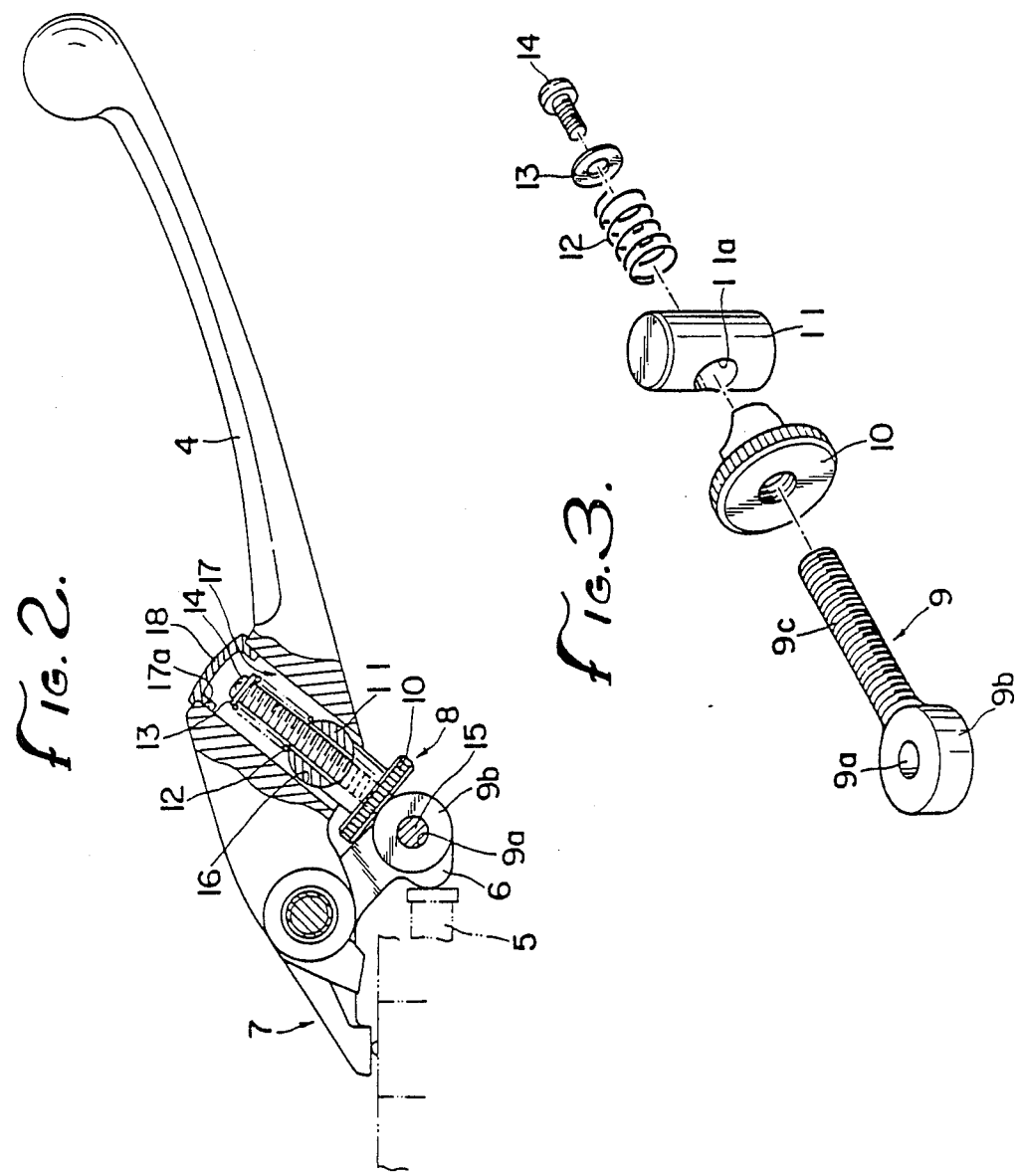

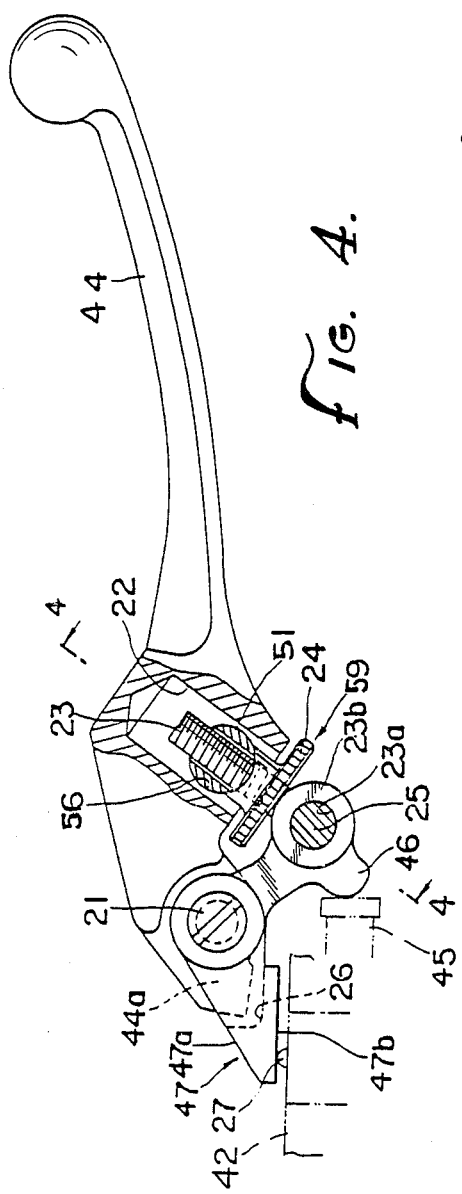
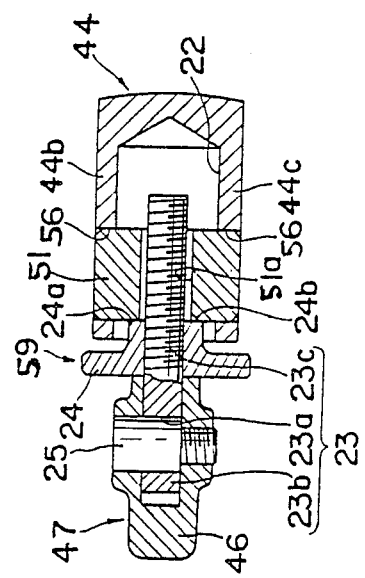
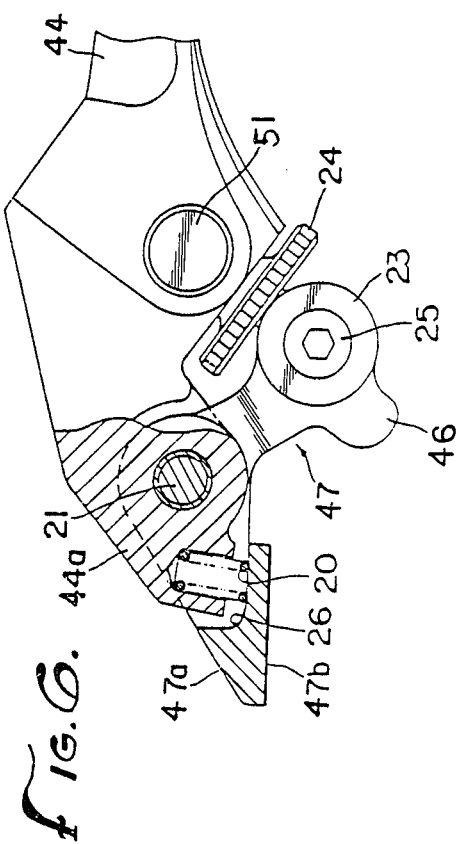

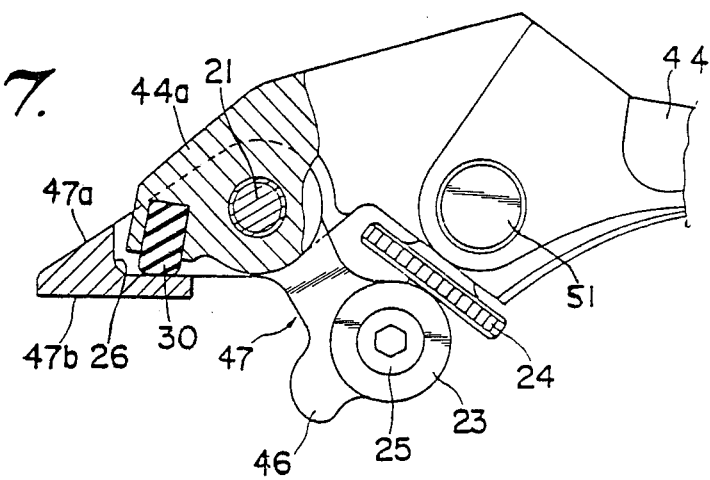
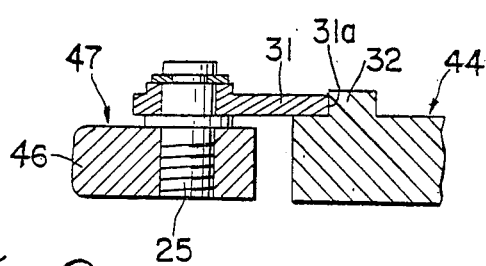
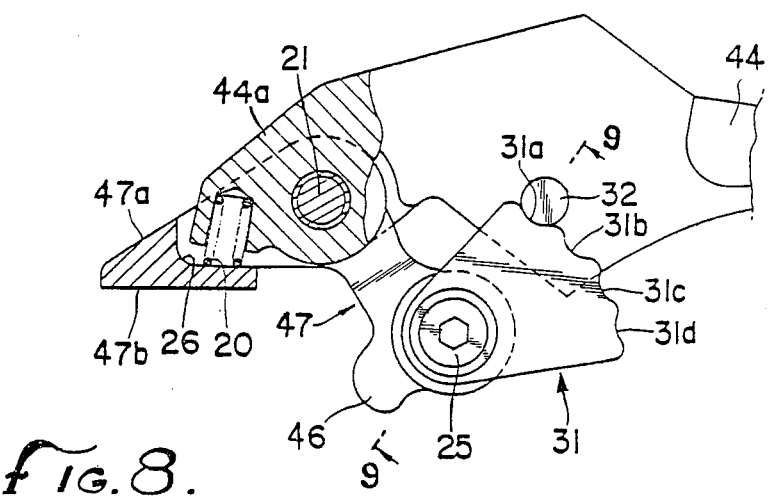

ADJUSTABLE MANIPULATING LEVER FOR MOTORCYCLE

BACKGROUND OF THE INVENTION

The field of the invention is a hand-operated lever control, adjustable to accommodate various hand sizes.

Hand-operated lever controls that are adjustable so that the control can be operated comfortably by persons with varying sizes of hands are known in the art. However, several problems have been encountered with these devices. Firstly, the adjustable mechanism is difficult and expensive to assemble and maintain. Further, the resilient means in the mechanism is at times insufficient to keep the moving body, to which the adjusting mechanism is attached, against the input means. When the pivotally mounted moving body is not substantially abutting the input means "dead travel" results wherein a certain amount of squeezing is required just to get the level member to contact the input means. Also, when there is not substantial abutment between the lever member and the input means, the lever member is more likely to rattle, vibrate and chatter.

SUMMARY OF THE INVENTION

The present invention is directed to an improved adjustable lever operated by the human hand. The adjustable lever is made to operate in conjunction with a stationary grip. The lever is adjustable so that it can be comfortably operated by varying sizes of hands but will impart the same degree of efficiency of operation regardless of the size of the hand because a resilient means ensures substantial abutment with the control means regardless of the size of the operator's hand.

BRIEF DESCRIPTION OF THE DRAWINGS

FIG. 2 is a partial cut-away view of the prior art embodiment;

FIG. 3 is an exploded perspective view showing the adjusting member of the prior art;

FIG. 4 is a partial cut-away view showing one embodiment of the subject invention;

FIG. 5 is a sectional view taken along line 4—4 in FIG. 4;

FIG. 6 is a partial cut-away view of the present embodiment;

FIG. 7 is a partial cut-away view showing an alternate embodiment of the resilient portion of the invention;

FIG. 8 is a partial cut-away view showing the alternate embodiment wherein the adjusting means is a cam mechanism; and FIG. 9 is a sectional view taken along line 9—9 in FIG. 8.

PREFERRED EMBODIMENTS OF THE INVENTION

Figure 1:
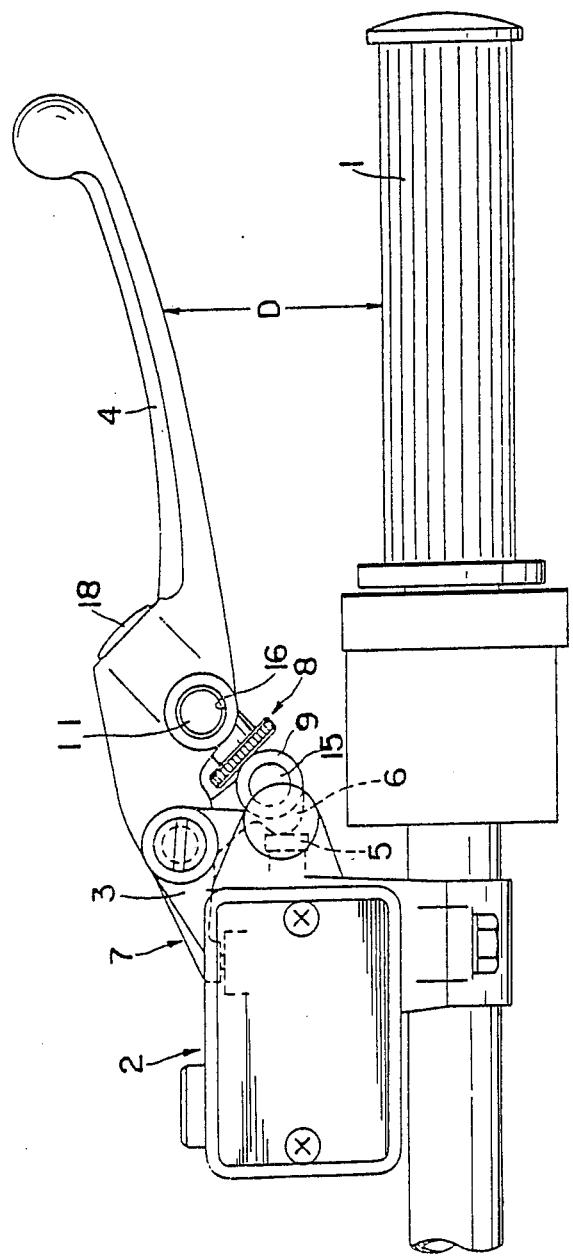
FIG. 1 is a plan view showing a mounting condition of the lever in the prior art.

Turning in detail to the drawings, FIG. 1 shows an earlier adjustable brake lever for a motorcycle which is capable of being easily adjusted. The distance between the handle grip 1 and the brake lever 4, indicated as D, can be adjusted to accommodate the hand size of the rider. The embodiment has a lever supporting arm 3 of a master cylinder 2 which is mounted on the handle bar 1. A brake lever 4 is typically pivotally mounted on the lever supporting arm 3 via pivot shaft 3a. A moving body 7 which has an approximate L-shape is pivotally mounted on the lever supporting arm 3 by the shaft 3a and has at one end an acting portion 6 which abuts an input end 5 of the master cylinder 2. An adjusting member 8 on the brake lever 4 adjusts the distance between the brake lever 4 and the moving body 7. This adjusting member 8 consists of a bolt 9 which has a flat cylindrical head 9b with a longitudinal bore 9a at its center. Adjusting member 8 also has a threaded shaft portion 9c, a circular nut 10 screwed on the bolt 9, a cylindrical shaft 11 which has a bore 11a through which bolt 9 passes. Also, a coil spring 12 is attached to the bolt by a screw 14 and a washer 13 which are attached to the leading end of the bolt 9. The pin 15 fixes the head 9b of the bolt 9 to the end of the moving body 7.

The shaft 11 is fitted into a bore 16 which runs from the front face to the rear face of the brake lever 4.

FIG. 2 shows a second bore 17 which runs from substantially the top of brake lever 4 to the bottom. The bore 17 intersects and is perpendicular to bore 16. The bolt 9 onto which circular nut 10 is fitted is inserted from the bottom of bore 17 and passes through the bore 11a provided horizontally in the shaft 11. The coil spring 12 is inserted on the shaft portion 9c from the top opening of bore 17. The screw 14 is screwed into the leading end of the shaft portion 9c, a washer 13 being used to retain the spring on the shaft as shown in FIG. 3. A lid 18 is then fitted onto the top opening of the bore 17. The turning of circular nut 10 adjusts the distance D between the brake lever 4 and the hand grip 1.

One embodiment of the present invention can be seen in FIGS. 4 to 6. This embodiment is comprised of a brake lever 44, a moving body 47, an adjusting screw 59 for adjusting the distance between the brake lever 44 and the moving body 47, and the spring member 20.

The brake lever 44 forms a protruding portion 44a at its base portion and is typically pivotally mounted via shaft 21 on a lever supporting arm similar to the arms 3 shown in FIG. 1 on a master cylinder 42 which is mounted on a handlebar (not shown). As shown in FIG. 5 near the portion of brake lever 44 that is pivotally mounted to moving body 47 is a horizontal bore forming and opening 22 extending from the innermost surface of brake lever 44 toward but not through the outermost surface thereof. Further in FIG. 5 a bore 56 intersecting and perpendicular to the bore opening 22 extends through brake lever 44 from surface 44b through surface 44c.

The moving body 47 is substantially L-shaped and is pivotally secured by the shaft 21 to the brake lever 44 at the bent center portion thereof. At one end of the moving body 47 is provided an acting portion 46 which substantially abuts input 45 of the master cylinder 42, toward the inside.

The adjusting screw 59 has a bolt 23 which consists of a flat, cylindrical head 23b which has a longitudinal bore 23a at its center and a threaded shaft portion 23c with a circular nut 24 screwed on the bolt as shown in FIG. 5. The head 23b of the bolt 23 is secured by a shaft 25 through the bore 23a near the acting portion 46 of the moving body 47. The circular nut 24 is screwed onto the shaft portion 23c and the shaft portion 23c is inserted into the bore opening 22 of the brake lever 44. Prior to the insertion of the shaft portion of bolt 23 into the bore opening 22, the cylindrical shaft 51, having a bore 51a is inserted into the bore 16 which intersects bore opening 22. Therefore, when the shaft portion 23c is inserted through the bore opening 22 it also passes through the bore 51a in cylindrical shaft 51. Arched recesses 24a and 24b are provided on circular nut 24.

As seen in FIG. 6, on the other end of the moving body 47 is a recess 26 that confronts and receives the protruding portion 44a of the brake lever 44. Between the protruding portion 44a and the base of the recess 26 is a spring member 20 in the form of a coil spring. The inside surface 47b engages and abuts a stop lamp switch 27 which is on top of master cylinder 42. The pressure on the stop lamp switch 27 is released when the brake lever 44 is depressed, so that the brake light comes on when the brake lever is pressed.

The spring member 20 urges the brake lever 44 in the clockwise direction about the shaft 21 and therefore the brake lever 44 forces the acting portion 46 of the moving body 47 to abut the input end 45 of the master cylinder 42 via the adjustable mechanism 59 and ensures that there is very little wobble or play in the mechanism.

The circular nut 24 is rotated to adjust the distance corresponding to the distance D in FIG. 1 between the brake lever 44 and the hand grip (not shown).

In this case the arched recesses 24a, 24b of the raised face of the circular nut 24 are provided so that the nut is secured in its place with respect to the shaft 51, the arched recesses conforming to and fitting substantially against the exterior of shaft 51 when circular nut 24 is locked into position. This ensures that the lever will not fall out of adjustment due to vibration or jarring of the motorcycle.

FIG. 7 shows another embodiment of the present invention in which the spring member 20 of coil spring used in the above embodiment is replaced by a rubber resilient member 30. There is no substantial difference between the operation of this embodiment and the one described above.

Also, FIGS. 8 and 9 show another embodiment of the adjusting mechanism in which the adjusting screw used in each of the above embodiments is replaced by a notched cam 31 which adjusts the distance between the brake lever 44 and the moving body 47. The notched cam 31 rotatably mounted on the shaft 25 of the moving body 47 is designed to adjust the distance between the brake lever 44 and the moving body 47 and, thereby, the distance between the lever and the hand grip (not shown) as represented by the distance D in FIG. 1 by engaging a projection 32 of the brake lever 44 with recesses 31a, 31b, 31c, and 31d, each having a different diameter so that each setting varies the distance between the brake lever and the hand grip.

While there have been described above the principles of this invention in connection with a specific apparatus, it is to be clearly understood that this description is made only by way of example and not as a limitation to the scope of the invention.

What is claimed is:

1. For use with a motorcycle having a handle grip and a master cylinder containing an input end fixed with respect to said handle grip, the combination comprising:
    a lever having an operating portion at one end and a protruding portion at its other end;
    pivot means intermediate the ends of said lever for pivotally connecting said lever with respect to said master cylinder;
    a moving body connected intermediate its ends by said pivot means for coaxial pivotal movement with respect to said lever and to said master cylinder, said moving body having an acting portion at one end for operably engaging said master cylinder input end and means forming a base at its other end disposed in facing relation to said lever protruding portion;
    means interconnecting the operating portion of said lever and the acting portion of said moving body for adjusting the angular position therebetween; and
    means disposed between said moving body base and said lever protruding portion for resiliently biasing said lever operating portion toward said moving body acting portion.

2. The combination of claim 1 wherein said adjustable means comprises:
    a bolt secured to said moving body;
    a captive nut engaging said bolt between said lever and said moving body; and
    means for rotating said captive nut for adjusting the distance between said lever operating portion and said moving body acting portion.

3. The combination of claim 2 wherein said lever includes:
    means forming an opening receiving said bolt;
    a shaft having a bore encircling said bolt fixedly positioned in said opening, and
    means on said captive nut engageable with said shaft for setting the position of said nut with respect to said bolt.

4. The combination of claim 3 wherein said shaft is a cylindrical body and said setting means is an arcuately formed recess of a shape complementary to that of said shaft to prevent relative rotational movement between said nut and said shaft.

5. The combination of claim 1 wherein said adjustable means comprises:
    an adjustable cam rotatably mounted about an axis on one of said lever operating portion and said moving body acting portion and a projection fixedly mounted on the other thereof;
    said cam having a peripheral edge containing a plurality of arcuately spaced notches, said notches each being on different radial spacing from said axis.

6. The combination of claim 1 wherein said moving body base-forming means is a recess sized to receive said lever protruding portion.

7. The combination of claim 1 wherein said resilient means is a coil spring.

8. The combination of claim 1 wherein said resilient means is a body of elastomeric material.

9. For use with a motorcycle having a handle grip and a control member fixed with respect to said handle grip, the combination comprising:
    a lever having an operating portion at one end and a protruding portion at its other end;
    pivot means connecting said lever intermediate its ends for pivotal movement with respect to said control member;
    a moving body connected by said pivot means to said control member for relative angular movement with respect to said lever and to said control member, said moving body having an acting portion at one end for operably engaging said control member and means forming a base at its other end in facing relation to said lever protruding portion;
    adjustable means interconnecting said lever operating portion and said moving body acting portion; and resilient means between said moving body base and said lever protruding portion for biasing said lever operating portion toward said moving body acting portion.

10. The combination of claim 9 wherein said adjustable means comprises:
   a bolt secured to said moving body;
   a captive nut engaging said bolt between said lever and said moving body; and
   means for rotating said captive nut for adjusting the distance between said lever operating portion and said moving body acting portion.

11. The combination of claim 10 wherein said lever includes:
   means forming an opening receiving said bolt;
   a shaft having a bore encircling said bolt fixedly positioned in said opening, and
   means on said captive nut engageable with said shaft for setting the position of said nut with respect to said bolt.

12. The combination of claim 11 wherein said shaft is a cylindrical body and said setting means is an arcuately formed recess of a shape complementary to that of said shaft to prevent relative rotational movement between said nut and said shaft.

13. The combination of claim 9 wherein said adjustable means comprises:
   an adjustable cam rotatably mounted about an axis on one of said lever operating portion and said moving body acting portion and a projection fixedly mounted on the other thereof;
   said cam having a peripheral edge containing a plurality of arcuately spaced notches, said notches each being on different radial spacing from said axis.

14. The combination of claim 9 wherein said moving body base-forming means is a recess sized to receive said lever protruding portion.

15. The combination of claim 9 wherein said resilient means is a coil spring.

16. The combination of claim 9 wherein said resilient means is a body of elastomeric material.

* * * * *